United States Patent [19]
Sjostrand et al.

[11] 3,953,798
[45] Apr. 27, 1976

[54] METHOD AND DEVICE FOR RADIO TRANSMISSION OF BINARY DATA SIGNALS

[75] Inventors: Jan Roland Sjostrand; Lars Henning Zetterberg, both of Jarfalla, Sweden

[73] Assignee: U.S. Philips Corporation, New York, N.Y.

[22] Filed: Nov. 7, 1974

[21] Appl. No.: 521,928

[30] Foreign Application Priority Data
Nov. 9, 1973 Sweden............................ 7315253

[52] U.S. Cl.................. 325/30; 325/320; 178/66 R
[51] Int. Cl.²............................................ H02B 1/00
[58] Field of Search .............. 325/30, 163, 52, 56, 325/59, 65, 320, 154; 178/66 A, 66 R, 88; 179/15 BS, 15 FD, 15 R; 343/176, 179, 203, 204; 340/146.1 BA

[56] References Cited
UNITED STATES PATENTS

| | | | |
|---|---|---|---|
| 3,409,875 | 11/1968 | Jager et al. | 325/59 |
| 3,526,837 | 9/1970 | Zegers et al. | 325/59 X |
| 3,842,352 | 10/1974 | Cote | 325/56 |

*Primary Examiner*—Benedict V. Safourek
*Assistant Examiner*—Robert Hearn
*Attorney, Agent, or Firm*—Frank R. Trifari; Simon L. Cohen

[57] ABSTRACT

A method of eliminating multi-path propagation and time scattering effects on a radio transmitter channel and predominantly a short-wave channel when binary series of 1 and 0 bits are transmitted. Two frequency shift systems are used each having a 1 signal and a 0 signal frequency transmitted during a predetermined part of each bit interval, preferably half an interval. The signal frequencies are received time-selectively within a time slot having a length corresponding to the predetermined part of each bit interval. According to one embodiment a 1 bit is transmitted (received) by transmission (reception) of the 1 signal frequency of the first FSK system during the first half of the bit interval, followed by the 1 signal frequency of the second FSK system while the decision on the transmitted bit is taken on the basis of the superimposed bit information contributions of the two FSK systems. A device for carrying the method into effect is described.

5 Claims, 3 Drawing Figures

METHOD AND DEVICE FOR RADIO TRANSMISSION OF BINARY DATA SIGNALS

The invention relates to a method and device for ratio transmission of binary data signals, particularly data signals consisting of a binary sequence of 1 and 0 bits, each bit occurring during a predetermined bit interval.

A known method of transmitting such data signals uses a frequency shift modulation system, i.e. FSK-system with two signal frequencies representing the said 0 and 1 bits, respectively.

In the radio transmission of such data signals different interference sources frequently occur, the most important of which are due to multi-path propagation and frequency selective fading.

In short-wave transmission the greatest problem is this multi-path propagation i.e. echo signals appear after the actual data signal in a data transmission channel of the relevant type. Particularly in the transmission of binary information through transmission channels subject to such interference and in those cases where the requirements imposed on transmission reliability are stringent, these echo signals cause serious problems which are due to the fact that the echo signals during reception are superimposed on a subsequent information bit and may consequently mutilate the information contents of the transmitted data signals.

Another known method of radio transmission of binary data signals uses two FSK-systems each providing a frequency representative of the relevant bit to be transmitted, which frequencies are transmitted with a mutual time difference of, for example, 2 seconds. Since the same information bit is transmitted twice over different frequency channels and with a mutual delay of approximately 2 seconds, the sensitivity to interference for fading phenomena is considerably reduced when using this method, but the influence of multi-path propagation is not eliminated in this manner because this known method does not suppress correlated interference sources.

An object of the invention is to provide a method and a device for use of this method in which not only the sensitivity to interference of uncorrelated interference as caused by fading phenomena is considerably reduced, but which in addition suppresses the influence of correlated interference such as results from multi-path propagation.

According to the invention this method for radio transmission of data signals is characterized in that at least two FSK-systems are used each having two distinct signal frequencies representing the 0 and 1 bits, respectively, and this in such a manner that in the transmission of a certain bit information the 1 or 0 signal frequencies representative of the relevant bit information are directly transmitted one after the other during a separate predetermined part of the bit interval and that each of the transmitted signal frequencies is time-selectively received and detected at the receiver end within a time slot having a duration which corresponds to the duration of said predetermined part of the bit interval.

When using the method according to the invention the echo signals possibly occurring due to multi-path propagation can substantially have no influence on the instantaneously received directly transmitted signal frequency; it is true that the instantaneously received directly transmitted signal frequency and the previous signal frequency (echo) delayed as a result of multi-path propagation simultaneously occur at the receiver end, but since this preceding signal frequency differs from the directly transmitted signal frequency and since the reception is time-selective, the delayed signal frequency is not detected.

The method according to the invention likewise counteracts the said frequency selective fading (time scattering), i.e. the pulse shape of a transmitted pulse signal is distorted during the transmission so that an increased time distribution and further combined effects of multi-path propagation and time scattering occur. In this connection it is to be noted that the use of the method according to the invention is not limited to short-wave transmission and that corresponding advantages are obtained for all relevant fading channels.

According to a preferred embodiment of the method according to the invention a first and a second FSK-system mutually having a satisfactory frequency separation are used which are alternately active during half the bit interval and in which each 1 bit is transmitted by transmission of the signal frequency representative of an 1 bit of the first FSK system during the first half of the bit interval followed by the signal frequency representative of an 1 bit of the second FSK system during the second half of the bit interval, while each 0 bit is transmitted by transmission of the signal frequencies representative of a 0 bit of the FSK systems during the corresponding halves of the bit interval, the signal frequencies being received time-selectively within a time slot having a length equal to half the bit interval, while the bit information of the complete bit interval is recovered by superimposition of the bit information contributions of the two FSK systems and the decision about the transmitted bit is taken on the basis of the recovered complete bit information.

For the above-mentioned embodiment of the method according to the invention a simple and reliable transmission and reception equipment may be used, obtaining the following advantages:

a. elimination of the influence of multi-path propagation and time scattering b. effective use of the transmission power since the full power can be utilised per signal frequency c. use of a simple transmitter construction since only one signal frequency is transmitted during a time slot (which in this preferred embodiment is equal to half the bit interval)

d. use of a receiver of simple construction because it may include two FSK demodulators and because the combination of information from each of the demodulators can be obtained with simple means.

A device according to the invention is particularly suitable for slow data transmission, i.e. a transmission speed in the order of 100 to 300 bits per second through a speech channel having a useful frequency band of approximately 2500 Hz. A device of this kind is insensitive to interference generated by linear distortion on the channel because the signal frequencies are separately detected.

It is to be noted that the method and the device according to the invention also counteract interference of the time-selective fading type (frequency scattering) due to the split-up in parallel data channels and the degree of frequency diversity obtained thereby, for example, they eliminate the influence of frequency range distribution of a transmission signal frequency during transmission.

The invention will further be described with reference to a drawing in which.

Figure 1:
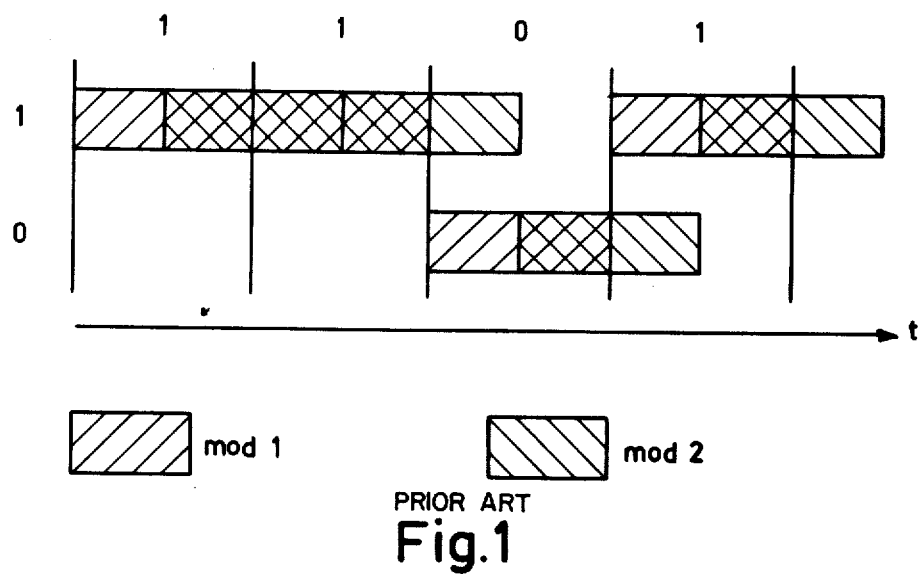
FIG. 1 shows a signal time diagram with the influence of multi-path propagation on a bit series 1101.

FIG. 1 shows a signal time diagram with the influence of multi-path propagation shown in this Figure by a first and a second signal mode of a bit series 1101 and an assumed length of the said first and second mode time shift which is equal to half the bit length. As is apparent from the Figure the second 1-signal mode is added to the first 1 signal mode after half a bit interval and therefore causes a "1-tail" extending to half the 0 bit interval while the second 0 signal mode accordingly causes a "0-tail" extending to half the bit interval of the first 1-signal mode representative of an 1 bit. These "tails" and superimposition effects will of course cause interference in case of reception of a bit series so that the transmitted information may be erroneously interpreted.

Since according to the invention the reception is time-selectively performed in synchronization with the received bit series the said interference and the effect of the said "tails" is eliminated. In this connection it is to be noted that these effects may likewise be eliminated by using a single FSK system in which the signal frequencies are only transmitted during the first half of each bit interval and in which no information is transmitted during the second half of each bit interval. By performing the reception time-selectively in this case during the first halves of the bit intervals the second signal mode may freely decay during the second halves of the bit intervals. A transmission system of this kind has, however, considerable drawbacks because the transmitter must be rendered inactive during the said second halves of the bit intervals so that a more complicated transmitter construction is necessary and because the available transmitter power usually limited to the peak value is not utilized to an optimum extent.

Figure 2:
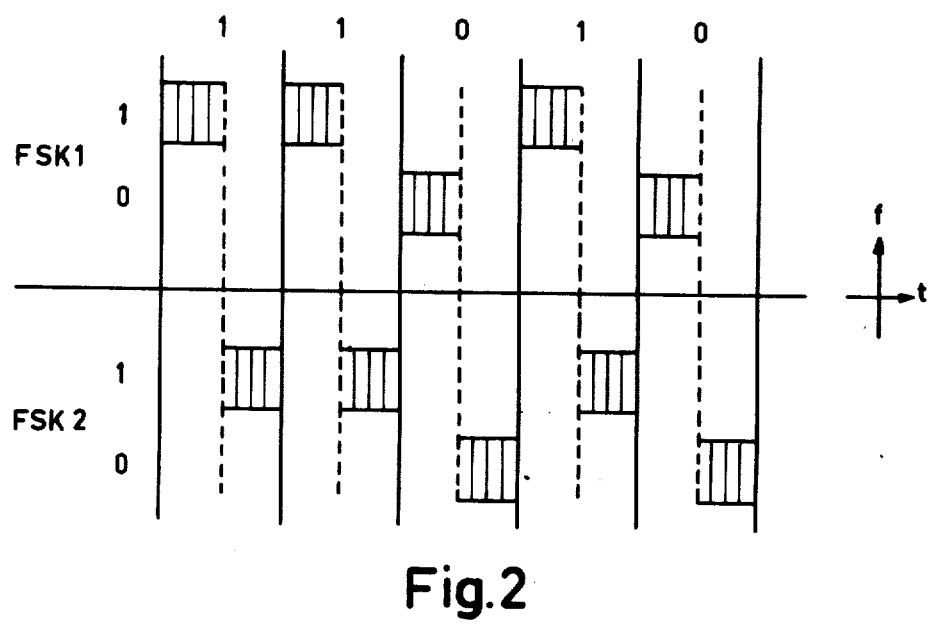
FIG. 2 shows a frequency time circuit of a double FSK system according to the invention and FIG. 3 shows an embodiment of a receiver for carrying out the method according to the invention.

FIG. 2 shows a frequency time diagram of a preferred embodiment according to the invention in which a double FSK system is used having a satisfactory frequency separation and in which the frequency separations between the signal frequency pairs of each system are chosen to be equal to the inverse value of half the bit interval. The Figure also shows the time separation between the two systems.

Figure 3:
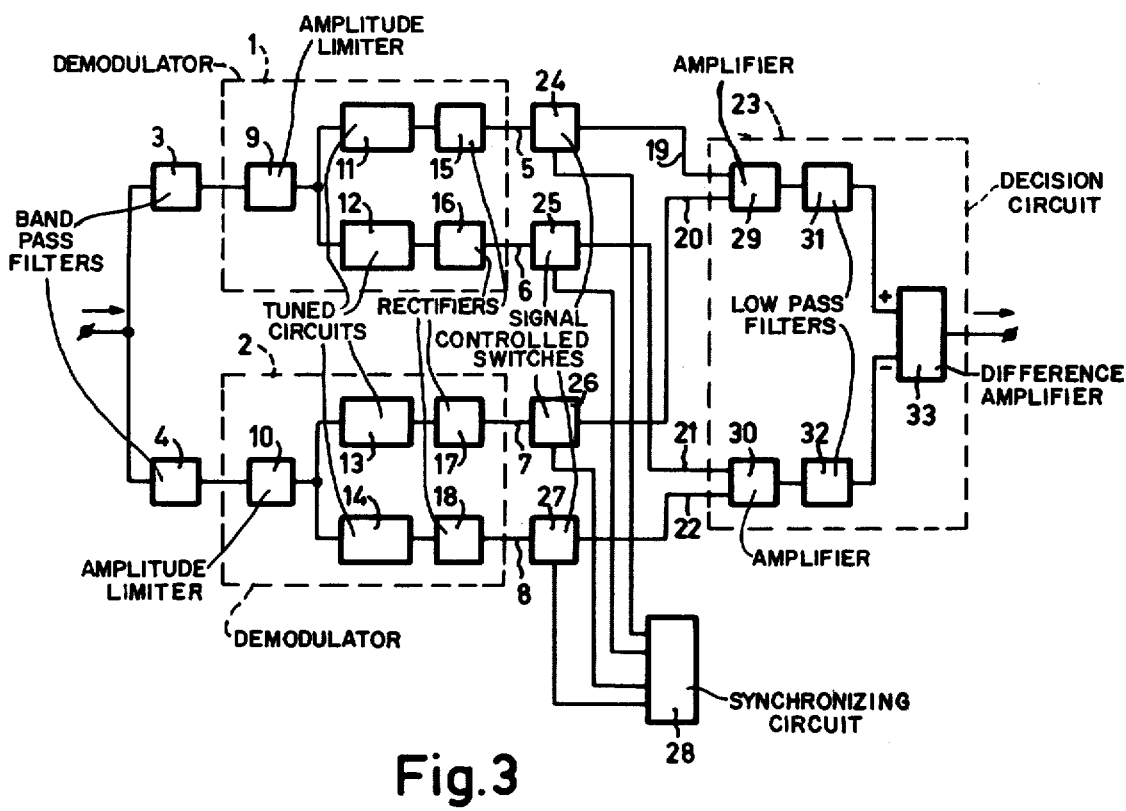

A receiver for carrying said preferred embodiment of the method according to the invention into effect is shown in FIG. 3. The receiver includes demodulators 1 and 2 of a known type for each FSK system. The transmitted signal is applied to the receiver after demodulation of the carrier frequency level to the signal frequency level for which the demodulators 1 and 2 receive the signal through bandpass filters 3 and 4 in the correct form for passing on the signal frequency pair of the FSK systems. Each demodulator 1, 2 is provided with two outputs 5, 6 and 7, 8, respectively.

The demodulators 1, 2 may have amplitude limiters 9 and 10, respectively, at their input sides whose outputs are connected to circuits 11 and 13 tuned to the 1 signal frequency of the FSK system and to circuits 12 and 14 tuned to the corresponding 0 signal frequencies.

The outputs of each of the tuned circuits 11, 12, 13 and 14 are connected through rectifiers 15, 16, 17, 18 to one of the demodulator outputs 5, 6, 7, 8, respectively. Each output supplies a pulsatory output signal when the corresponding signal frequency is detected.

Each output 5, 6, 7, 8 is connected to a corresponding input 19, 20, 21, 22 of a decision circuit 23 through switches 24, 25, 26, 27, respectively.

The switches 24, 25, 26, 27 are controlled by a bit synchronizing circuit 28 which is synchronized by means of synchronizing information co-transmitted with the data information. The control function is performed in such a manner that the switches 24, 25 connected to the demodulator 1 of the first FSK system are closed during the first half of the bit interval when the switches 26, 27 are open. During the second half of the bit interval the switches 30, 31 are closed and the switches 24, 25 are open.

The outputs of the switches 24, 26 are connected to the first input pair 19, 20 of the decision circuit 23 and the switches 25, 27 are connected to the second input pair 21, 22 of the decision circuit 23.

For each of the input pairs the decision circuit 23 has amplifiers 29 and 30 which are connected through lowpass filters 31 and 32 to the + and − inputs, respectively, of a difference amplifier 33.

During the first half of each bit interval the lowpass filters 31, 32 receive information through the switches 24, 25 and during the second half of the bit interval they receive information through the switches 26, 27. Dependent on the signal level integrated by the lowpass filters 31, 32 the difference amplifier 33 supplies a positive or a negative output signal indicating a received 0 bit or 1 bit.

What is claimed is:

1. A method of transmitting and receiving binary data signals using different signal frequencies to represent the 1 and 0 bits of said binary data signals, comprising the steps of transmitting each bit of said binary data signal periodically during bit intervals, transmitting a first of said different signal frequencies to represent a binary 1 during a first portion of a bit interval, transmitting a second of said different signal frequencies redundantly representing said binary 1 during a second portion of said bit interval, transmitting a third of said different signal frequencies representing a binary 0 during a first portion of a subsequent bit interval, transmitting a fourth of said different signal frequencies redundantly representing said binary 0 during a second portion of said subsequent bit interval, activating a receiver to response only to said first and third signal frequencies during the first portion of each bit interval, and activating said receiver to respond only to said second and fourth signal frequencies during the second portion of each bit interval.

2. A method as recited in claim 1, wherein said first and second portions of a bit interval each comprise one-half of the bit interval, and wherein the steps of activating said receiver comprises the steps of superimposing during each first half of each bit interval the contribution of the first and third signal frequencies, and superimposing during each second half of each bit interval the contributions of the second and fourth signal frequencies.

3. A device for receiving binary signals transmitted with four different frequency signals, wherein a binary 1 is transmitted in the form of a first of said four different frequency signals during a first half of a bit interval and a second of said four different frequency signals during a second half of said bit interval, and wherein a binary 0 is transmitted in the form of a third of said four different frequency signals during a first half of a subsequent bit interval and a fourth of said four different frequency signals during a second half of said subsequent bit interval, said receiver comprising a first bandpass filter means for passing said first and third frequency signals, a second bandpass filter means for passing said second and fourth frequency signals, a first tuned circuit connected to said first bandpass filter for passing only said first frequency signal, a second tuned circuit connected to said second bandpass filter for passing only said second frequency signal, a third tuned circuit connected to said first bandpass filter for passing only said third frequency signal, a fourth tuned circuit connected to said second bandpass filter for passing only said fourth frequency signal, switching means connected to the output of each of said tuned circuits for passing the output of said first and third tuned circuits during said first half of each bit interval and for passing the output of said second and fourth tuned circuits during said second half of each bit interval, a decision circuit means for providing binary 1 and 0 outputs in response to signals on first and second inputs thereof, first circuit means connecting said first input of said decision circuit to said first and third tuned circuits through said switching means, and second circuit means connecting said second input of said decision circuit to said second and fourth tuned circuits through said switching means.

4. A device as recited in claim 3, wherein said first circuit means comprises a first integrator connected to said first and third tuned circuits, and wherein said second circuit means comprises a second integrator connected to said second and fourth tuned circuits, said first and second integrators superimposing said respective frequency signals connected thereto.

5. Apparatus as recited in claim 4, wherein said decision means comprises a differential amplifier for providing positive and negative signals in response to said signals from said first and second integrators.

* * * * *